US011867665B2

(12) United States Patent
Kobayashi et al.

(10) Patent No.: US 11,867,665 B2
(45) Date of Patent: Jan. 9, 2024

(54) ULTRASONIC PROBE AND ULTRASONIC INSPECTION DEVICE

(71) Applicant: KABUSHIKI KAISHA TOSHIBA, Tokyo (JP)

(72) Inventors: Tsuyoshi Kobayashi, Kawasaki Kanagawa (JP); Tomio Ono, Yokohama Kanagawa (JP); Norihiko Tanaka, Yokohama Kanagawa (JP); Tomonori Abe, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/677,254

(22) Filed: Feb. 22, 2022

(65) Prior Publication Data

US 2023/0076916 A1 Mar. 9, 2023

(30) Foreign Application Priority Data

Sep. 7, 2021 (JP) ................................. 2021-145606

(51) Int. Cl.

| | |
|---|---|
| ***G01N 29/24*** | (2006.01) |
| ***G01N 29/14*** | (2006.01) |
| ***B06B 1/06*** | (2006.01) |
| *G01H 11/08* | (2006.01) |

(52) U.S. Cl.

CPC ......... *G01N 29/245* (2013.01); *B06B 1/0644* (2013.01); *G01N 29/14* (2013.01); *G01H 11/08* (2013.01)

(58) Field of Classification Search

CPC .... G01N 29/245; G01N 29/14; B06B 1/0644; G01H 11/08

See application file for complete search history.

(56) References Cited

U.S. PATENT DOCUMENTS

| | | | |
|---|---|---|---|
| 4,770,699 A | 9/1988 | Mountford | |
| 2014/0182382 A1* | 7/2014 | Kruger | B01B 1/06 73/632 |
| 2017/0191022 A1* | 7/2017 | Lipkens | C12M 29/02 |
| 2018/0015505 A1* | 1/2018 | Stevenson | B06B 1/0681 |
| 2021/0199517 A1* | 7/2021 | Miyata | G01L 1/167 |

FOREIGN PATENT DOCUMENTS

| | | |
|---|---|---|
| JP | S61-502208 A | 10/1986 |
| JP | H08-84397 A | 3/1996 |
| WO | WO-85/05449 A1 | 12/1985 |

* cited by examiner

*Primary Examiner* — Suman K Nath

(74) *Attorney, Agent, or Firm* — Foley & Lardner LLP

(57) ABSTRACT

According to one embodiment, an ultrasonic probe includes a first member and a first vibrating element. The first member includes at least one selected from the group consisting of metal and ceramic. The first vibrating element includes a first electrode, a piezoelectric layer provided between the first electrode and the first member, and a second electrode provided between the piezoelectric layer and the first member and being in contact with the first member.

19 Claims, 4 Drawing Sheets

110
51b
51
L1
W1
51a
11b
11c
11a
11E
t2
t3
t1
Z
Y
X

ULTRASONIC PROBE AND ULTRASONIC INSPECTION DEVICE

CROSS-REFERENCE TO RELATED APPLICATIONS

This application is based upon and claims the benefit of priority from Japanese Patent Application No. 2021-145606, filed on Sep. 7, 2021; the entire contents of which are incorporated herein by reference.

FIELD

Embodiments described herein generally relate to an ultrasonic probe and an ultrasonic inspection device.

BACKGROUND

For example, there is an inspection device using ultrasonic waves or the like. Improvement of inspection accuracy is desired.

DETAILED DESCRIPTION

Figure 1A:
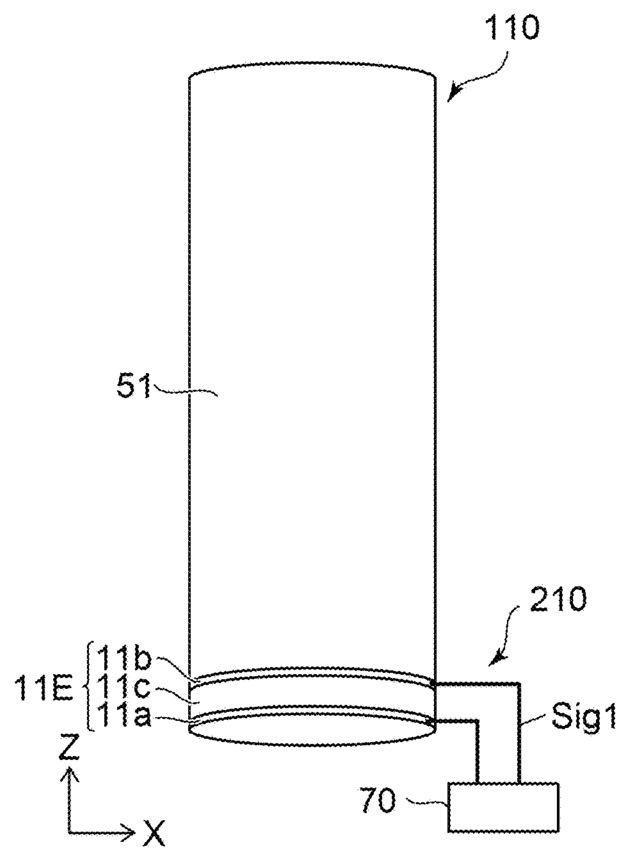
FIGS. 1A and 1B are schematic views illustrating an ultrasonic probe according to a first embodiment.

According to one embodiment, an ultrasonic probe includes a first member and a first vibrating element. The first member includes at least one selected from the group consisting of metal and ceramic. The first vibrating element includes a first electrode, a piezoelectric layer provided between the first electrode and the first member, and a second electrode provided between the piezoelectric layer and the first member and being in contact with the first member.

According to one embodiment, an ultrasonic inspection device includes the ultrasonic probe described above, and a circuit part configured to apply a voltage between the first electrode and the second electrode.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
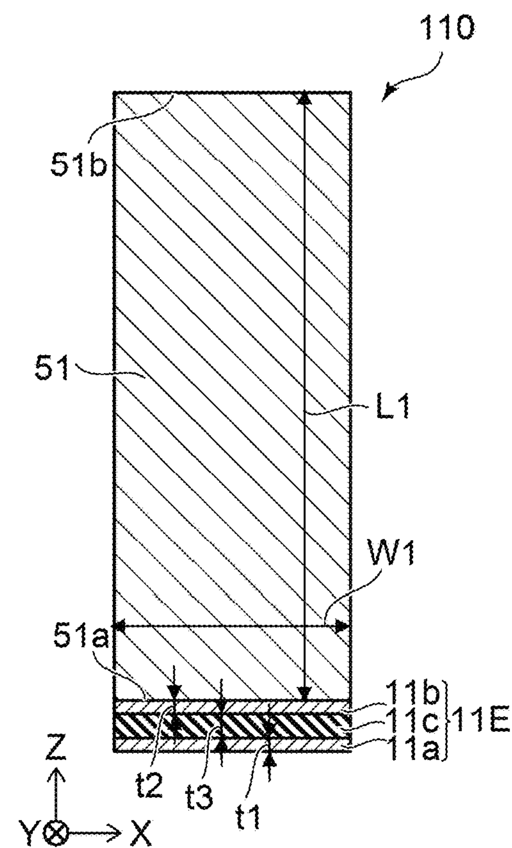

FIGS. 1A and 1B are schematic views illustrating an ultrasonic probe according to a first embodiment.

FIG. 1A is a perspective view. FIG. 1B is a cross-sectional view.

As shown in FIG. 1A, an ultrasonic probe 110 according to the embodiment includes a first member 51 and a first vibrating element 11E. The first member 51 includes at least one selected from the group consisting of metal and ceramic. The first member 51 is, for example, a metal body. The first member 51 may be, for example, a ceramic body. The first member 51 can have various shapes.

The first vibrating element 11E includes a first electrode 11*a*, a second electrode 11*b*, and a piezoelectric layer 11*c*. The piezoelectric layer 11*c* is located between the first electrode 11*a* and the first member 51. The second electrode 11*b* is provided between the piezoelectric layer 11*c* and the first member 51. The second electrode 11*b* is in contact with the first member 51. The piezoelectric layer 11*c* is in contact with the first electrode 11*a* and the second electrode 11*b*. For example, the first member 51 may support the first vibrating element 11E. The first electrode 11*a*, the second electrode 11*b*, and the piezoelectric layer 11*c* include an inorganic material.

As shown in FIGS. 1A and 1B, a first direction from the first electrode 11*a* to the second electrode 11*b* is defined as a Z-axis direction. One direction perpendicular to the Z-axis direction is defined as an X-axis direction. The direction perpendicular to the Z-axis direction and the X-axis direction is defined as a Y-axis direction.

The first electrode 11*a*, the second electrode 11*b*, and the piezoelectric layer 11*c* spread substantially in parallel along the X-Y plane.

As shown in FIG. 1A, the ultrasonic inspection device 210 according to the embodiment includes the ultrasonic probe 110 and a circuit part 70. The circuit part 70 is electrically connected with the first electrode 11*a* and the second electrode 11*b*. The circuit part 70 can apply a voltage (voltage signal Sigh) between the first electrode 11*a* and the second electrode 11*b*.

A thickness t3 of the piezoelectric layer 11*c* (see FIG. 1B) changes according to the voltage applied between the first electrode 11*a* and the second electrode 11*b*. By changing the thickness t3 of the piezoelectric layer 11*c*, ultrasonic waves are emitted from the first vibrating element 11E. A part (first part) of the ultrasonic wave travels in the direction from the piezoelectric layer 11*c* to the first electrode 11*a*. As will be described later, this ultrasonic wave is incident on the inspection target. By receiving the ultrasonic waves reflected by the inspection target, condition of the inspection target is inspected. Further, another part (second part) of the ultrasonic wave generated by the first vibrating element 11E travels in the direction from the piezoelectric layer 11*c* to the second electrode 11*b*, and travels in the first member 51. The second portion of the ultrasonic wave is attenuated in the process of traveling through the first member 51.

In the embodiment, the second electrode 11*b* is in contact with the first member 51. For example, no layer of other material is provided between the second electrode 11*b* and the first member 51. For example, the second electrode 11*b* and the first member 51 are directly bonded. As described above, the first member 51 includes at least one selected from the group consisting of metal and ceramic. These materials are inorganic materials. The difference in acoustic impedance between the first vibrating element 11E (for example, the second electrode 11*b*) and the first member 51 is small. As a result, the reflection of the second portion of the ultrasonic wave is suppressed at the interface between the first vibrating element 11E (for example, the second electrode 11*b*) and the first member 51.

A first reference example in which the first member 51 includes an organic material such as rubber can be conceivable. In the first reference example, the first vibrating element 11E is fixed to the first member 51 via an adhesive layer of an organic material (for example, epoxy resin). In this first reference example, the difference in acoustic impedance between the first vibrating element 11E made of an inorganic material and the adhesive layer is large. Therefore, in the first reference example, the second portion of the ultrasonic wave is strongly reflected at the interface between the first vibrating element 11E and the adhesive layer. The reflected ultrasonic waves are mixed with the ultrasonic waves (reflected waves) from the inspection target and become noise. In the first reference example, it is difficult to sufficiently improve the accuracy of the inspection of the inspection target. In the first reference example, there is a case where the acoustic impedances differ between the first member 51 and the adhesive layer. At this time, the second portion of the ultrasonic wave is strongly reflected at the interface between the first member 51 and the adhesive layer. Even at this time, it is difficult to obtain high accuracy due to noise.

In the embodiment, the second electrode 11*b* is in contact with the first member 51. Then, the difference in acoustic impedance between the first vibrating element 11E (for example, the second electrode 11*b*) and the first member 51 is small. As a result, the reflection of the second portion of the ultrasonic wave is suppressed. Noise is suppressed. In the embodiment, it is possible to provide an ultrasonic probe capable of improving inspection accuracy.

In the first reference example, an elastic member such as rubber is used as the first member 51. As a result, an attempt is made to attenuate the ultrasonic waves (second portion) traveling in the direction from the piezoelectric layer 11*c* to the second electrode 11*b* to reduce noise. In the first reference example, the first member 51 functions as a backing material for attenuating ultrasonic waves. However, as described above, the difference in acoustic impedance between the first member 51 and the first vibrating element 11E is large. Further, the difference in acoustic impedance between the adhesive layer provided between them and the first vibrating element 11E is also large. Therefore, the influence of reflection at the interface is large, and it is difficult to detect with high sensitivity due to noise.

In the embodiment, there is a case where the ultrasonic wave generated by the first vibrating element 11E is difficult to be attenuated in the first member 51. In the embodiment, the length of the first member 51 may be sufficiently long. As a result, it is possible to suppress that the generated ultrasonic waves are attenuated in the first member 51 and the ultrasonic waves propagating in the first member 51 become noise. For example, it takes a sufficiently long time for the ultrasonic waves reflected at the end of the first member 51 to reach the first vibrating element 11E. Thereby, the separation of the ultrasonic waves (noise) propagating in the first member 51 and the ultrasonic waves reflected by the inspection target becomes easy. Noise can be suppressed.

As shown in FIG. 1B, a length of the first member 51 along the first direction (Z-axis direction) from the first electrode 11*a* to the second electrode 11*b* is defined as a length L1. A width of the first member 51 along a direction perpendicular to the first direction is defined as a width W1. The direction perpendicular to the first direction may be a direction along the X-Y plane, for example, the X-axis direction. The width W1 may be the maximum length of the first member 51 in one direction along the X-Y plane. In the embodiment, the length L1 is set sufficiently long.

For example, the length L1 of the first member 51 is not less than 50 mm. For example, the ultrasonic waves can be attenuated and noise can be effectively suppressed. For example, the ultrasonic waves (noise) reflected at the end of the first member 51 and the ultrasonic waves reflected by the inspection target can be easily separated. In the embodiment, the length L1 may be not more than 100 mm. If the length L1 is excessively long, the device becomes excessively large. When the length L1 is not more than 100 mm, a practical small device can be obtained.

The length L1 may be, for example, not less than 4 times the width W1. As a result, the ultrasonic waves can be effectively attenuated and noise can be suppressed. The length L1 may be, for example, not more than 100 times the width W1. A practical small device can be obtained.

In the examples shown in FIGS. 1A and 1B, the first member 51 extends along the Z-axis direction. In the embodiment, the first member 51 may be bent in any direction. In this case, in the first member 51, the length in the propagation direction of the ultrasonic wave may be considered to be the length L1.

For example, the ultrasonic wave emitted from the first vibrating element 11E propagates in the first member 51. The length of the first member 51 along the propagation path of the ultrasonic wave in the first member 51 may be the length L1. The maximum value of the width of the first member 51 along the direction perpendicular to the propagation path may be the width W1. In the embodiment, such a length L1 may be not less than 4 times the width W1.

As shown in FIG. 1B, the first member 51 includes a first face 51*a* and a second face 51*b*. The first face 51*a* faces the second electrode 11*b*. The first face 51*a* is in contact with the second electrode 11*b*. The second face 51*b* is the face opposite to the first face 51*a* in the ultrasonic wave propagation path. When the first member 51 extends along one direction (for example, the Z-axis direction), the first face 51*a* is between the second electrode 11*b* and the second face 51*b*. In this case, the length L1 corresponds to the distance between the first face 51*a* and the second face 51*b*.

In the first reference example in which an elastic body such as rubber is used as the first member 51, ultrasonic waves are greatly attenuated during propagation through the first member 51. Therefore, in the first reference example, the length L1 of the first member 51 may be short. In the first reference example, the length L1 may generally be twice or less the width W1.

On the other hand, in the embodiment, the acoustic impedance of the first member 51 is close to the acoustic impedance of the first vibrating element 11E. Therefore, the degree of ultrasonic wave attenuation in the first member 51 is low. The relationship between the length L1 and the width W1 as described above is a special configuration in the embodiment in which the acoustic impedance of the first member 51 is close to the acoustic impedance of the first vibrating element 11E.

Figure 2A:
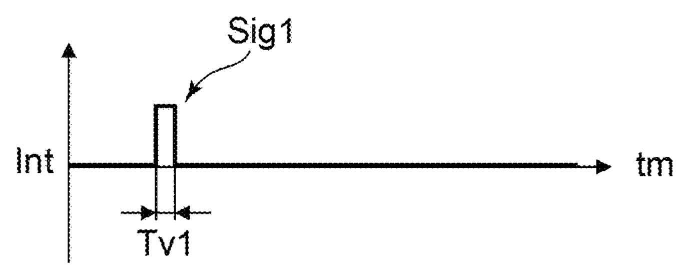
FIGS. 2A and 2B are schematic views illustrating the operation of the ultrasonic probe according to the first embodiment.
Figure 2B:
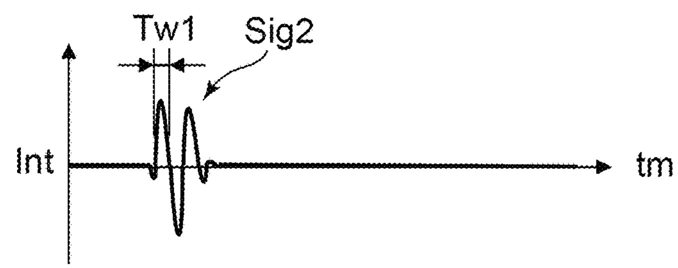

FIGS. 2A and 2B are schematic views illustrating the operation of the ultrasonic probe according to the first embodiment.

The horizontal axis of these figures is time tm. The vertical axis of FIG. 2A is the intensity Int of the voltage (voltage signal Sig1) applied between the first electrode 11*a* and the second electrode 11*b*. Ultrasonic waves are emitted from the first vibrating element 11E based on the voltage signal Sig1. The vertical axis of FIG. 2B corresponds to the intensity Int of the ultrasonic wave (ultrasonic signal Sig2).

As shown in FIG. 2A, a pulsed voltage (voltage signal Sig1) is applied between the first electrode 11*a* and the second electrode 11*b*. The pulse width Tv1 is, for example, not less than 0.0025 μs and not more than 0.1 μs.

As shown in FIG. 2B, the ultrasonic signal Sig2 is emitted from the first vibrating element 11E in response to the voltage signal Sig 1. As shown in FIG. 2B, the ultrasonic signal Sig2 generated from one pulse voltage may include a plurality of peaks. The plurality of peaks are caused by the residual vibration of the first vibrating element 11E. The time width Tw1 of one of the plurality of peaks included in the ultrasonic signal Sig2 is, for example, not less than 0.01 μs and not more than 1.0 μs. The inspection is performed by the ultrasonic signal Sig2 incident on the inspection target and reflected. The width (time width) of one of the plurality of peaks included in the ultrasonic signal Sig2 may be substantially the same as the pulse width Tv1. The frequency of the ultrasonic signal Sig2 may be substantially the reciprocal of the pulse width Tv1.

Figure 3:
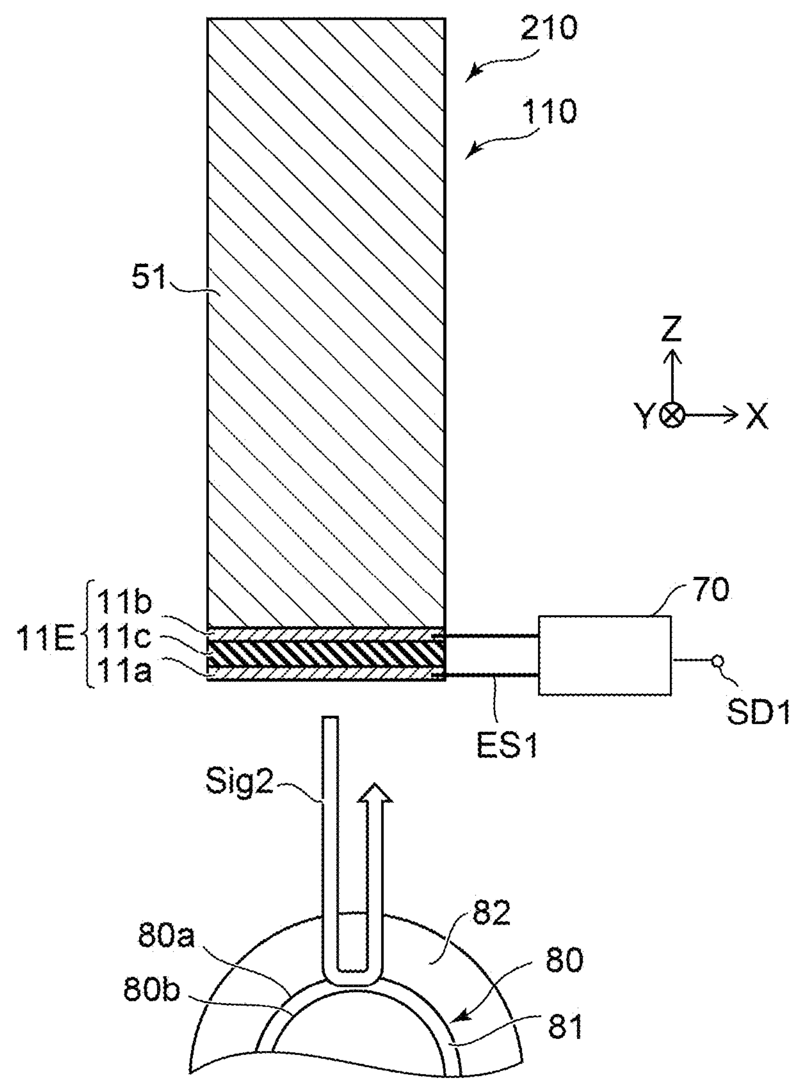
FIG. 3 is a schematic diagram illustrating an operating state of the ultrasonic probe according to the first embodiment.

FIG. 3 is a schematic diagram illustrating an operating state of the ultrasonic probe according to the first embodiment.

As shown in FIG. 3, the ultrasonic signal Sig 2 emitted from the first vibrating element 11E is incident on the inspection target 80. The ultrasonic signal Sig2 is reflected by the inspection target 80. The reflected wave (ultrasonic signal Sig2) reflected by the inspection target 80 is received by the ultrasonic probe 110. The state of the inspection target 80 is inspected by the received reflected wave. In the ultrasonic probe 110, the reception of the reflected wave (ultrasonic signal Sig2) may be performed by the first vibrating element 11E.

For example, the reflected wave is generated by reflecting the ultrasonic wave (ultrasonic signal Sig2) emitted from the first vibrating element 11E at the inspection target 80. The reflected wave is incident on the first vibrating element 11E. The circuit part 70 can acquire the electric signal ES1 generated between the first electrode 11*a* and the second electrode 11*b* in response to the reflected wave (reflected wave of the ultrasonic signal Sig2). The first vibrating element 11E can function as an oscillating element. The first vibrating element 11E can function as a receiving element. The circuit part 70 can output the inspection result SD1 of the inspection target 80 based on the electric signal ES1.

The inspection target 80 is, for example, an inspection target film 81 provided on a structure body 82. The structure body 82 is, for example, a wall of a chamber. The inspection target film 81 is provided on the inner surface of the wall of the chamber. The inspection target film 81 is, for example, a liquid thin film. The thickness of the structure body 82 is considerably thicker than the thickness of the film 81 to be inspected. The thin inspection target film 81 is inspected through such a thick structure body 82.

In such an application, the ultrasonic signal Sig2 emitted from the first vibrating element 11E is absorbed by the thick structure body 82, and the reflected wave reflected by the inspection target film 81 is weakened. In such applications, it is particularly desired to reduce noise. Noise is a particular problem in such applications. Noise is generated, for example, by reflecting ultrasonic waves emitted from the first vibrating element 11E at the interface on the side (back side) of the first member 51.

In the embodiment, even in such an application, the reflection of ultrasonic waves at the interface on the side (back side) of the first member 51 can be suppressed. Thereby, high-sensitivity inspection can be performed even in such applications.

As shown in FIG. 3, the inspection target 80 (inspection target film 81) includes a first interface 80*a* and a second interface 80*b*. The first interface 80*a* is an interface between the film 81 to be inspected and the structure body 82. The first interface 80*a* is an interface on the incident side of the ultrasonic wave. The second interface 80*b* is an interface on the opposite side of the first interface 80*a*. The second interface 80*b* is the back surface.

Figure 4A:
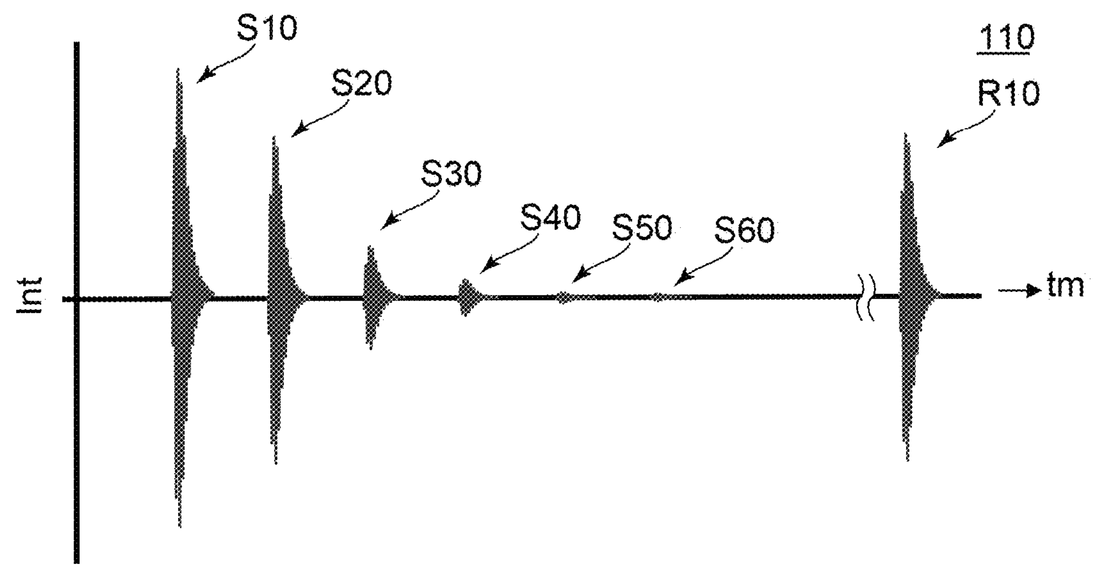
FIGS. 4A and 4B are schematic views illustrating the characteristics of the ultrasonic probe.
Figure 4B:
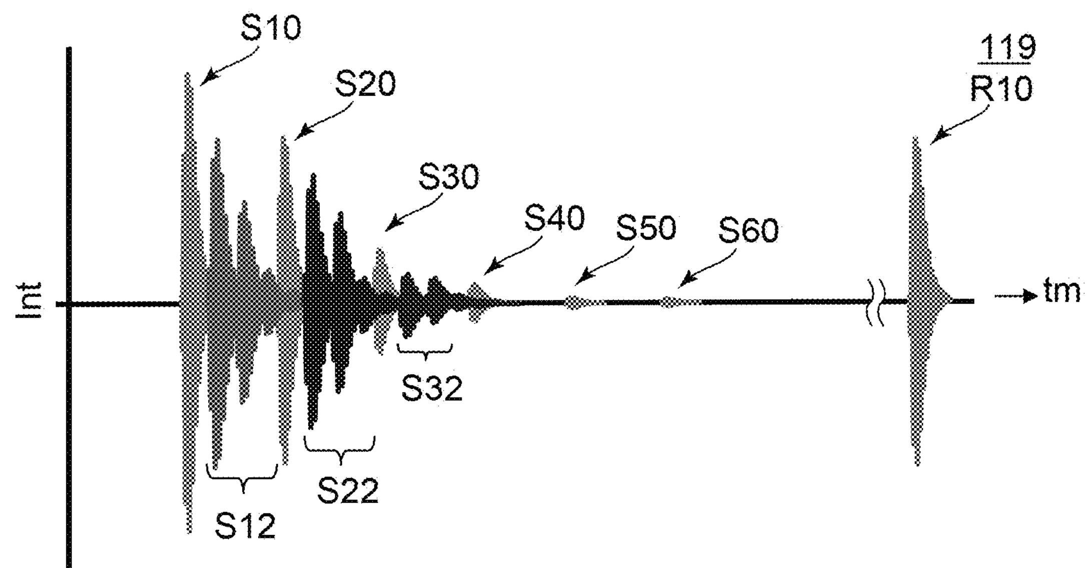

FIGS. 4A and 4B are schematic views illustrating the characteristics of the ultrasonic probe.

FIG. 4A corresponds to the ultrasonic probe 110 according to the embodiment. In the ultrasonic probe 110, the first member 51 is a metal. In this example, the first member 51 includes an alloy including Pb and Sn. In this alloy, the composition ratio of Pb is 70 wt % and the composition ratio of Sn is 30 wt %. In this alloy, the acoustic impedance is about $30\times10^6$ kg/m$^2$ s). In this example, the length L1 of the first member 51 is 100 mm.

FIG. 4B corresponds to an ultrasonic probe 119 of the first reference example described above. As described above, in the first reference example, the first member 51 is rubber. In the first reference example, a resin adhesive layer is provided between the first member 51 and the first vibrating element 11E. In the first reference example, ultrasonic waves are reflected at the interface between the first member 51 and the adhesive layer due to the difference in acoustic impedance between the first member 51 and the adhesive layer.

In these figures, the horizontal axis is time tm. In these figures, the vertical axis is the intensity Int of ultrasonic waves (ultrasonic signal Sig2).

As shown in FIG. 4A, waveforms S10 to S60 and R10 are observed in the ultrasonic signal Sig2 in the ultrasonic probe 110. The waveform S10 corresponds to the reflected wave at the first interface 80*a* of the film 81 to be inspected. The ultrasonic wave corresponding to the waveform S10 has not passed through the membrane 81 to be inspected. The waveform S20 corresponds to the reflected wave at the second interface 80*b* of the film 81 to be inspected. The ultrasonic wave corresponding to the waveform S20 passes back and forth once in the membrane 81 to be inspected. The waveforms S30 to S60 correspond to ultrasonic waves that reciprocate and pass through the membrane 81 to be inspected a plurality of times. The waveform R10 corresponds to an ultrasonic wave reflected by the second face 51*b* and incident on the first vibrating element 11E.

As shown in FIG. 4A, the waveforms are separated and received in the ultrasonic probe 110. For example, the thickness of the inspection target 80 (inspection target film 81) can be detected based on the time difference between the waveform S10 and the waveform S20. The thickness is, for example, the distance between the first interface 80*a* and the second interface 80*b*.

As shown in FIG. 4B, in the ultrasonic probe 119, the waveform of the ultrasonic signal Sig2 includes other waveforms S12, S22, S32 and the like in addition to the waveforms S10 to S60 and R10. The other waveform S12 is caused by the ultrasonic waves corresponding to the waveform S10 being reflected a plurality of times at the interface between the first member 51 and the adhesive layer. The other waveform S22 is caused by the ultrasonic waves corresponding to the waveform S20 being reflected a plurality of times at the interface between the first member 51 and the adhesive layer. The other waveform S32 is caused by the ultrasonic waves corresponding to the waveform S30 being reflected a plurality of times at the interface between the first member 51 and the adhesive layer.

As shown in FIG. 4B, for example, at least a part of the waveform S12 exists between the waveform S10 and the waveform S20. A part of the waveform S12 overlaps the waveform S20. In the ultrasonic probe 119 according to the first reference example, it is difficult to separate a plurality of waveforms included in the ultrasonic signal Sig2. Such waveforms (waveforms S12, S22 and S32) become noise in detecting the reflected wave from the inspection target 80. Therefore, the accuracy of the inspection is low.

On the other hand, as shown in FIG. 4A, noisy waveforms (waveforms S12, S22, S32, etc.) are not substantially observed in the ultrasonic probe 110. Noise is suppressed in such a waveform.

In the embodiment, the first electrode 11*a* may include, for example, at least one selected from the group consisting of Ag, Ti, Cr, Ni, Cu, Au and Pt. The first electrode 11*a* may include an oxide including In (for example, Indium Tin Oxide). The first electrode 11*a* may include stacked films including the above materials. These electrodes may include, for example, a baked silver electrode. The first electrode 11*a* may be formed by, for example, at least one of plating, vapor deposition, and sputtering. The first electrode 11*a* may be formed by metallizing, for example, by clad crimping or the like. The thickness t1 of the first electrode 11*a* (see FIG. 1B) is, for example, not less than 0.05 μm and not more than 300 μm.

The second electrode 11*b* may include, for example, at least one selected from the group consisting of Ag, Ti, Cr, Ni, Cu, Au and Pt. The second electrode 11*b* may include an oxide including In (for example, Indium Tin Oxide). The second electrode 11*b* may include stacked films including the above materials. The second electrode 11*b* may include, for example, a baked silver electrode. The second electrode 11*b* may be formed by, for example, at least one of plating, vapor deposition, and sputtering. The thickness t2 of the second electrode 11*b* (see FIG. 1B) is, for example, not less than 0.05 μm and not more than 300 μm.

The piezoelectric layer 11*c* includes at least one selected from the group consisting of $PbZnNbTiO_3$ (lead zinc niobium titanate), $PbMgNbTiO_3$ (lead magnesium niobium titanate), $PbZrTiO_3$ (lead zirconate titanate), $PbTiO_3$ (lead titanate), and $PbNbO_5$ (lead niobate), for example. Ultrasonic waves can be generated with high efficiency. For example, the reflected wave can be inspected with high sensitivity. The lead zinc niobium titanate and the lead magnesium niobium titanate may be, for example, a piezoelectric single crystal. The lead zirconate titanate, lead titanate and lead niobate may be, for example, piezoelectric ceramics. The thickness t3 of the piezoelectric layer 11*c* is, for example, not less than 0.05 μm and not more than 4 mm.

The thicknesses are the lengths along the Z-axis direction. In the embodiment, the thickness t1 and the thickness t2 may be sufficiently thinner than the thickness t3. From the viewpoint of acoustic impedance, the thickness t1 of the first electrode 11*a* and the thickness t2 of the second electrode 11*b* may be practically ignored. For example, as the acoustic impedance of the first vibrating element 11E, the acoustic impedance of the piezoelectric layer 11*c* may be practically adopted.

In the embodiment, the acoustic impedance of the first member 51 is not less than about $10\times10^6$ kg/($m^2$ s) and not more than $35\times10^6$ kg/($m^2$ s). As mentioned above, the first member 51 includes at least one selected from the group consisting of metal and ceramic. The acoustic impedance of the metal is not less than about $10\times10^6$ kg/($m^2$ s) and not more than $60\times10^6$ kg/($m^2$ s). The acoustic impedance of ceramic is not less than about $10\times10^6$ kg/($m^2$ s) and not more than $40\times10^6$ kg/($m^2$ s). The acoustic impedance of the piezoelectric layer 11*c* included in the first vibrating element 11E is not less than about $15\times10^6$ kg/($m^2$ s) and not more than $32\times10^6$ kg/($m^2$ s). The first electrode 11*a* and the second electrode 11*b* include a metal. The acoustic impedance of the first electrode 11*a* and the second electrode 11*b* is not less than about $20\times10^6$ kg/($m^2$ s) and not more than $28\times10^6$ kg/($m^2$ s).

In the embodiment, the acoustic impedance of the first member 51 is preferably higher than ½ of the acoustic impedance of the first vibrating element 11E. The difference in acoustic impedance is reduced, and the effect of reflection is suppressed. The acoustic impedance of the first member 51 may be higher than ½ of the acoustic impedance of the piezoelectric layer 11*c*.

In the embodiment, the acoustic impedance of the first member 51 is preferably not more than the acoustic impedance of the first vibrating element 11E, for example. The difference in acoustic impedance is reduced, and the effect of reflection is suppressed. The acoustic impedance of the first member 51 may be, for example, not more than the acoustic impedance of the piezoelectric layer 11*c*.

The first member 51 includes, for example, a first metal. By using metal, the manufacture of the first member 51 become easy. The first metal included in the first member 51 is preferably a metal having a low melting point. For example, a stable connection between the first vibrating element 11E and the first member 51 can be obtained. The melting point of the first metal is preferably not more than 250° C. The first metal may be, for example, solder.

Figure 5:
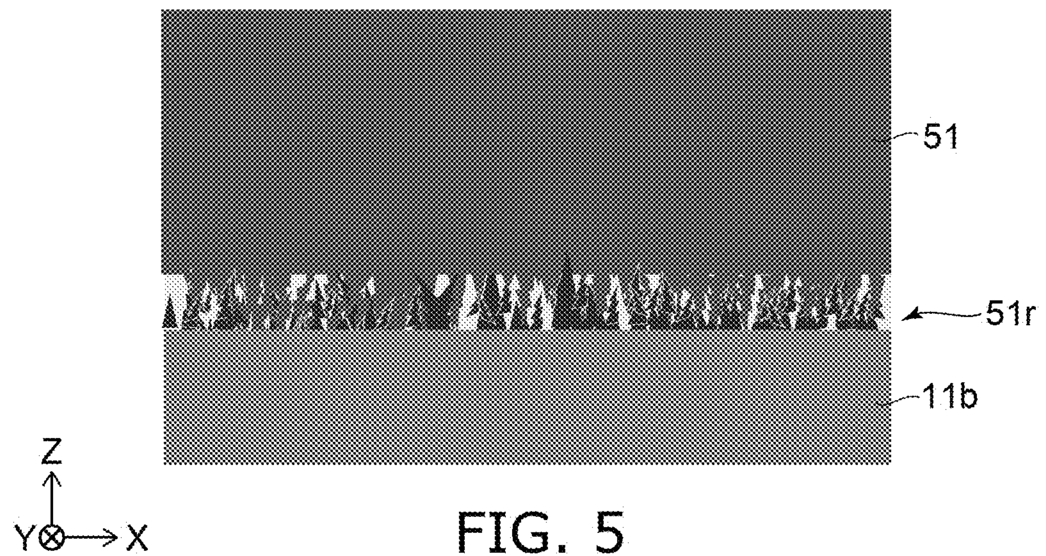
FIG. 5 is a schematic cross-sectional view illustrating an ultrasonic probe.

FIG. 5 is a schematic cross-sectional view illustrating an ultrasonic probe.

As shown in FIG. 5, in one example, an element included in the second electrode 11*b* and an element included in the first member 51 may exist in a mixed manner in a region 51*r* including a region between the second electrode 11*b* and the first member 51. For example, the region 51*r* includes one of the elements included in the second electrode 11*b* and one of the elements included in the first member 51. The element included in the second electrode 11*b* may be one of the metal elements included in the second electrode 11*b*. One of the elements included in the first member 51 may be one of the metal elements included in the first member 51. For example, such a second electrode 11*b* and a first member 51 can be obtained by friction diffusion bonding. In such a configuration, the second electrode 11*b* is considered to be in contact with the first member 51.

In another example, one of the elements included in the second electrode 11*b* and one of the elements included in the first member 51 may be bonded by silicon. This silicon may be, for example, silicon included in a coupling agent. For example, such a second electrode 11*b* and a first member 51 can be obtained by molecular bonding. In such a configuration, the second electrode 11*b* is considered to be in contact with the first member 51.

Second Embodiment

The second embodiment relates to an ultrasonic inspection device. As described with respect to FIG. 1A, the ultrasonic inspection device 210 includes the ultrasonic probe 110 and the circuit part 70 according to the first embodiment. The circuit part 70 is configured to apply a voltage (voltage signal Sig) between the first electrode 11*a* and the second electrode 11*b*.

Based on the voltage (voltage signal Sig1), the reflected wave of ultrasonic waves emitted from the first vibrating element 11E can be incident on the first vibrating element 11E. The circuit part 70 can acquire the electric signal ES1 generated between the first electrode 11*a* and the second electrode 11*b* in response to the reflected wave (reflected wave of the ultrasonic signal Sig2) (see FIG. 3).

As described with respect to FIG. 3, the reflected wave is generated by the ultrasonic wave (ultrasonic signal Sig2) emitted from the first vibrating element 11E being reflected by the inspection target 80. The circuit part 70 is configured to output the inspection result SD1 of the inspection target 80 based on the electric signal ES1.

The embodiments may include the following configurations (e.g., technical proposals).

Configuration 1

An ultrasonic probe, comprising:

a first member including at least one selected from the group consisting of metal and ceramic; and a first vibrating element, the first vibrating element including:

a first electrode, a piezoelectric layer provided between the first electrode and the first member, and a second electrode provided between the piezoelectric layer and the first member and being in contact with the first member.

Configuration 2

The probe according to Configuration 1, wherein an acoustic impedance of the first member is higher than ½ of an acoustic impedance of the first vibrating element.

Configuration 3

The probe according to Configuration 2, wherein the acoustic impedance of the first member is not more than the acoustic impedance of the first vibrating element.

Configuration 4

The probe according to Configuration 2 or 3, wherein the acoustic impedance of the first member is not less than $15 \times 10^6$ kg/($m^2$ s).

Configuration 5

The probe according to any one of Configurations 1 to 4, wherein the first member includes a first metal, and a melting point of the first metal is not more than 250° C.

Configuration 6

The probe according to any one of Configurations 1 to 5, wherein the second electrode includes at least one selected from the group consisting of Ag, Ti, Cr, Ni, Cu, Au and Pt.

Configuration 7

The probe according to any one of Configurations 1 to 6, wherein a thickness of the second electrode is not less than 0.05 μm and not more than 300 μm.

Configuration 8

The probe according to any one of Configurations 1 to 7, wherein the piezoelectric layer is in contact with the first electrode and the second electrode.

Configuration 9

The probe according to any one of Configurations 1 to 8, wherein the piezoelectric layer includes at least one selected from the group consisting of $PbZnNbTiO_3$, $PbMgNbTiO_3$, $PbZrTiO_3$, $PbTiO_3$, and $PbNbO_5$.

Configuration 10

The probe according to any one of Configurations 1 to 9, wherein a thickness of the piezoelectric layer is not less than 0.05 μm and not more than 4 mm.

Configuration 11

The probe according to any one of Configurations 1 to 10, wherein the first electrode includes at least one selected from the group consisting of Ag, Ti, Cr, Ni, Cu, Au and Pt.

Configuration 12

The probe according to any one of Configurations 1 to 11, wherein a thickness of the first electrode is not less than 0.05 μm and not more than 300 μm.

Configuration 13

The probe according to any one of Configurations 1 to 12, wherein an ultrasonic wave emitted from the first vibrating element propagate in the first member, a length of the first member along a propagation path of the ultrasonic wave in the first member is not less than 4 times a maximum value of a width of the first member along a direction perpendicular to the propagation path.

Configuration 14

The probe according to any one of Configurations 1 to 12, wherein a length of the first member along a first direction from the first electrode to the second electrode is not less than 4 times a width of the first member along a direction perpendicular to the first direction.

Configuration 15

The probe according to Configuration 13 or 14, wherein the length of the first member is not less than 50 mm and not more than 100 mm.

Configuration 16

The probe according to any one of Configurations 1 to 15, wherein a region including a region between the second electrode and the first member includes one of elements included in the second electrode and one of elements included in the first member.

Configuration 17

The probe according to any one of Configurations 1 to 15, wherein one of elements included in the second electrode and one of elements included in the first member are bonded by silicon.

Configuration 18

An ultrasonic inspection device, comprising:

the ultrasonic probe according to any one of configurations 1 to 17; and a circuit part configured to apply a voltage between the first electrode and the second electrode.

Configuration 19

The device according to Configuration 18, wherein a reflected wave of an ultrasonic wave emitted from the first vibrating element based on the voltage is configured to be incident on the first vibrating element, and the circuit part is configured to acquire an electric signal generated between the first electrode and the second electrode in response to the reflected wave.

Configuration 20

The device according to Configuration 19, wherein the reflected wave is generated by reflecting the ultrasonic wave emitted from the first vibrating element at an inspection target, and the circuit part is configured to output an inspection result of the inspection target based on the electric signal.

According to the embodiment, an ultrasonic probe and an ultrasonic inspection device capable of improving inspection accuracy can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in ultrasonic probes and ultrasonic inspection devices such as first members, vibrating elements, electrodes, piezoelectric layers, circuit parts, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all ultrasonics probes and all ultrasonic inspection devices practicable by an appropriate design modification by one skilled in the art based on the ultrasonics probes and ultrasonic inspection devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An ultrasonic probe, comprising:

a first member including a first metal; and a first vibrating element, the first vibrating element including:

a first electrode, a piezoelectric layer provided between the first electrode and the first member, and a second electrode provided between the piezoelectric layer and the first member and being in contact with the first member;

wherein one of elements included in the second electrode and a first metal element included in the first metal are bonded by silicon by molecular bonding, wherein the first member functions a backing material for attenuating ultrasonic waves.

2. The probe according to claim 1, wherein an acoustic impedance of the first member is higher than ½ of an acoustic impedance of the first vibrating element.

3. The probe according to claim 2, wherein the acoustic impedance of the first member is not more than the acoustic impedance of the first vibrating element.

4. The probe according to claim 2, wherein the acoustic impedance of the first member is not less than $15\times10^6$ kg/($m^2$ s).

5. The probe according to claim 1, wherein the first member includes a first metal, and a melting point of the first metal is not more than 250 C.

6. The probe according to claim 1, wherein the second electrode includes at least one selected from the group consisting of Ag, Ti, Cr, Ni, Cu, Au and Pt, and the one of elements included in the second electrode includes the at least one selected from the group consisting of Ag, Ti, Cr, Ni, Cu, Au and Pt.

7. The probe according to claim 1, wherein a thickness of the second electrode is not less than 0.05 μm and not more than 300 μm.

8. The probe according to claim 1, wherein the piezoelectric layer is in contact with the first electrode and the second electrode.

9. The probe according to claim 1, wherein the piezoelectric layer includes at least one selected from the group consisting of $PbZnNbTiO_3$, $PbMgNbTiO_3$, $PbZrTiO_3$, $PbTiO_3$, and $PbNbO_5$.

10. The probe according to claim 1, wherein a thickness of the piezoelectric layer is not less than 0.05 μm and not more than 4 mm.

11. The probe according to claim 1, wherein the first electrode includes at least one selected from the group consisting of Ag, Ti, Cr, Ni, Cu, Au and Pt.

12. The probe according to claim 1, wherein a thickness of the first electrode is not less than 0.05 μm and not more than 300 μm.

13. The probe according to claim 1, wherein an ultrasonic wave emitted from the first vibrating element propagate in the first member, a length of the first member along a propagation path of the ultrasonic wave in the first member is not less than 4 times a maximum value of a width of the first member along a direction perpendicular to the propagation path.

14. The probe according to claim 1, wherein a length of the first member along a first direction from the first electrode to the second electrode is not less than 4 times a width of the first member along a direction perpendicular to the first direction.

15. The probe according to claim 13, wherein the length of the first member is not less than 50 mm and not more than 100 mm.

16. The probe according to claim 1, wherein a region including a region between the second electrode and the first member includes one of elements included in the second electrode and one of elements included in the first member.

17. An ultrasonic inspection device, comprising:

the ultrasonic probe according to claim 1; and a circuit part configured to apply a voltage between the first electrode and the second electrode.

18. The device according to claim 17, wherein a reflected wave of an ultrasonic wave emitted from the first vibrating element based on the voltage is configured to be incident on the first vibrating element, and the circuit part is configured to acquire an electric signal generated between the first electrode and the second electrode in response to the reflected wave.

19. The device according to claim 18, wherein the reflected wave is generated by reflecting the ultrasonic wave emitted from the first vibrating element at an inspection target, and the circuit part is configured to output an inspection result of the inspection target based on the electric signal.

* * * * *